April 13, 1954

R. BREITWIESER 2,675,020

VARIABLE ORIFICE FLOWMETER

Filed Oct. 3, 1949

INVENTOR
ROLAND BREITWIESER

BY *J. J. Schmitt*
*Walter S. Pauli*

ATTORNEYS

Patented Apr. 13, 1954

2,675,020

UNITED STATES PATENT OFFICE 2,675,020

VARIABLE ORIFICE FLOWMETER

Roland Breitwieser, Lakewood, Ohio

Application October 3, 1949, Serial No. 119,362

5 Claims. (Cl. 137—468)

(Granted under Title 35, U. S. Code (1952), sec. 266)

This invention relates to fluid flowmeters and in particular to a flowmeter provided with a variable orifice.

Among the objects of this invention are to provide a flowmeter which is operable with a high degree of accuracy; which is automatically adjustable to variable conditions of operation; which automatically maintains a constant differential pressure across the flowmeter valve orifice, and which indicates mass flow over a relatively wide flow range.

Other objects and features of the invention will appear on consideration of the following description of a preferred form of the invention and the accompanying drawing, in which Fig. 1 is a schematic lay-out of the flowmeter unit including a vertical section through the valve device;

Figure 1:
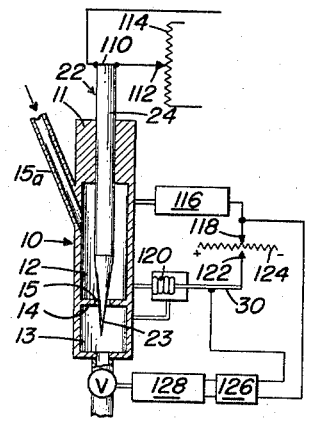

Referring to Fig. 1 of the drawings, 10 represents the main valve unit of the flowmeter and includes a solid head section 11 and tubular section divided into two chambers 12 and 13 separated by a partition plate 14. An inlet tube 15a connects to the chamber 12, an outlet tube to chamber 13 and an orifice 15 in plate 14 connects the two chambers.

In line with orifice 15 a needle valve 22 is slidably mounted in a tubular opening in head section 11, the valve having a tapered end 23 adapted for movement in the orifice 15 and a stem 24 of such length as to extend beyond the head section 11. The exposed outer stem end 110 carries a slider 112 movable along a uniform electrical resistance element 114 forming part of an electrical circuit.

Figure 5:
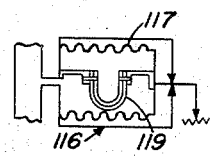
Fig. 5 is a detail view showing the temperature control element of Fig. 1.

The parts may be adjusted so that at zero resistance the orifice is closed and there is no flow. When the needle valve is at the extreme outward position, the orifice is at its maximum area and the resistance is at a maximum value. The resistance is therefore a function of the rate of flow and, electrical current flowing therethrough is in proportion to the rate of flow through the orifice and may be used to indicate the said rate of flow. The flowmeter here shown is provided with a power translating device such as the differential pressure sensitive element 120 which is in communication with both sides of the orifice and operates a sliding contact 122 along resistance 124 which is in series connection to a source of electrical current. A second power translating device such as the differential pressure instrument 116 hereinafter referred to as ΔP compensator communicates with the chamber on the upstream side of the orifice and functions to vary the ΔP so as to satisfy the relation $\rho \Delta P = K$ or $P_1 \Delta P / T = K$ similarly, where $\rho$ is the Greek letter rho indicating the density of the fluid, $P_1$ and $T$ are inlet absolute pressure and temperature respectively. Instrument 116 may take any conventional form such as shown, for example, in Fig. 5, where the bellows element 117 is susceptible to inlet pressure and the bimetallic element 119 contacts with increase of temperature and expands with temperature decrease. Both of these power translating devices function together as power summing apparatus to operate reversible motor 126 and thereby power controlled valve 128. The operation of these controls is as follows. Resistance 124 is energized by electric current passing from the positive to the negative side thereof. Contact 118 is set automatically by ΔP compensator 116 along this resistance. When fluid is flowing through the orifice at a definite needle valve setting differential pressures sensitive element 120 moves contact 122 to a position along resistance coil 124. As long as this contact is at a potential above that at the set contact 118 current will flow through contact 122 to operate reversible motor 126 and power controlled valve 128 in one direction and when contact 122 is at a potential below that at set contact 118 current will pass through the set contact to operate reversible motor 126 and valve 128 in the opposite direction. When contacts 118 and 122 are in alignment there is no passage of current to reversible motor 126 and the ΔP is maintained at the desired setting.

But if the inlet pressure and/or temperature of the fluid varies from that under which the ΔP setting 118 was made, the mass rate of flow can then be maintained by changing the position of the needle valve, which is not desirable or by changing the position of contact 118 along resistance coil 124. The latter is accomplished by means of ΔP compensator 116 which consists of a pressure sensitive element 117 coupled in opposition with a temperature element 119 so that when the pressure sensitive element 117 tends to move contact 118 to the right due to increased flowmeter inlet pressure, the temperature element 119 tends to move the point to the left thereby producing a resultant zero change and insuring that $\rho \Delta P$=constant, where $\rho$ is the density of the fluid. Thus, mass flow is held proportional to needle position only.

Figure 2:
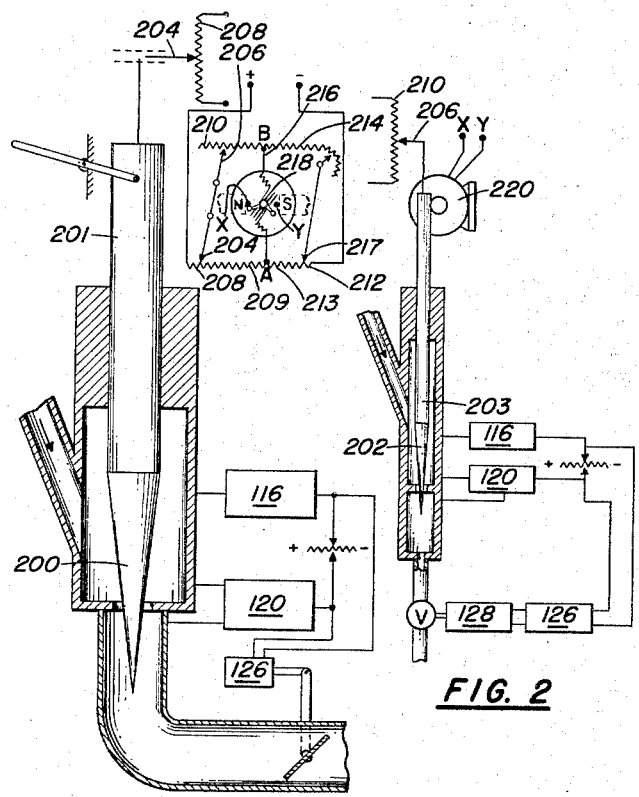
Fig. 2 is a view showing the controls of Fig. 1 applied to a combined liquid and gas unit.

Another arrangement to accomplish control of the fuel-air ratio is to provide flowmeters in which the needle valves are ground so that the penetration of the needles within the orifices is proportional to the rate of flow. This arrangement is illustrated in Figure 2 wherein a calibrated air flowmeter and fuel flowmeter for the maintenance of a predetermined fuel to air ratio are shown. Both flowmeters are provided with ΔP sensitive elements and ΔP compensators as shown in Figure 1. The tapered ends 200 and 202 of the needle valves 201 and 203 are conical. The exterior ends of these needle valves make sliding contacts 204 and 206 along graded variable resistances 208 and 210 respectively. These resistances form opposing legs of a Wheatstone bridge. Balanced against these resistances are the fuel-air ratio rheostat resistance 212 and the thereto opposed calibrating resistance 214. When the bridge is in balance there is no passage of current across bridge 216. Current impressed on resistance 208 divides one part passing through contact 204 over through contact 206 to resistance 210, thence through calibrating resistance 214 over to fuel-air rheostat 212 through contact 217 and thence to the return line. The other part of the impressed current passes through resistance 209, through resistance 213 to contact 217 and thence to the return line. In condition of unbalance current passes in one direction or the other over bridge 216 operating switch actuator 218 which feeds current through leads $x$ or $y$ to reversible motor 220 which moves needle valve 203 to increase or decrease the rate of fuel flow as the case may be and at the same time moves contact 206 along resistance 210 to restore the condition of balance in the Wheatstone bridge.

Figure 3:
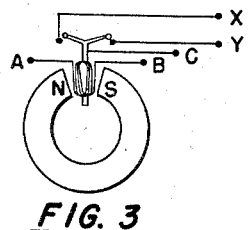
Figs. 3 and 4 are views illustrative of optional motor control for valve operation of the unit disclosed in Fig. 2.

Switch actuator 218 may be any one of several different types. It may be a polarized relay as shown in Figure 3 wherein the bridge current may pass in either direction through coil AB. This coil is suspended in a magnetic field and depending upon the direction of current flow rotates in one direction or the other to get into alignment with the magnetic field. When rotating in one direction it closes contact $x$ thereby feeding current $c$ to reversible motor 220 in one direction. When coil AB is rotated in the opposite direction it closes contact $y$ thereby feeding current $c$ to the said reversible motor in the opposite direction. Needle valve 203 is thus moved to open or close the orifice and to thereby increase or decrease the rate of fuel flow to maintain the predetermined fuel-air ratio.

Figure 4:
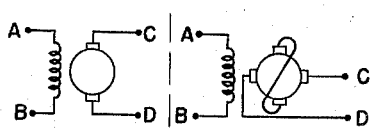

Switch actuator 218 may also be the D. C. generator or the Amplidyne generator shown in Figure 4. In both types of generators exciter coil AB is energized by the bridge current passing under condition of unbalance. Current passing through these exciter coils in one direction generates current flowing in one direction to reversible motor 220, and current passing through these exciter coils in the opposite direction generates current flowing in the opposite direction. Thus with either one of these generators reversible motor 220 functions as in the case of the polarized relay switch above described. The combination of the two flowmeters with the electrical control thereof as shown by this figure is therefore an automatic fuel-air ratio maintainer.

In operation of this arrangement the fuel-air ratio rheostat is set at the desired fuel to air ratio, the air needle valve is then set manually at the desired air flow rate and the electrical control moves the fuel flow needle valve to the position of fuel flow required by the setting of the fuel air rheostat. The position of the fuel flow needle valve is held in this position as long as the mass air flow remains at the preset value.

A flowmeter device as above described is necessarily based upon the physical law of fluid flow through an orifice. This law may be expressed by the equation:

$$M = A\beta\gamma K\sqrt{\rho\Delta P} \qquad (1)$$

where $M$ = Mass
$A$ = Area of orifice
$\beta$ = Entrance velocity coefficient
$\gamma$ = Viscosity coefficient
$K$ = A constant
$\rho$ = Density of the fluid
$\Delta P$ = Differential pressure across the orifice.

By properly choosing the design of the orifice, the entrance velocity and viscosity coefficients will not vary appreciably for the flow range of the orifice. The coefficients, since they do not vary may be represented by a single constant and Equation 1 becomes $$M = A K_1\sqrt{\rho\Delta P} \text{ or } A K_2\sqrt{\frac{P_1\Delta P}{T}}$$

where $P_1$ is the inlet absolute pressure at $T$ the absolute temperature.

By means (the ΔP controller) of the keeping the quantity $\sqrt{\rho\Delta P}$ constant, the mass rate of flow becomes a function of the area of the orifice. For fluids of different densities it is necessary to vary the ΔP inversely to the density in order to maintain the quantity $\sqrt{\rho\Delta P}$ at a constant value. This is apparent from an inspection of the quantity under the radical. The following is a specific example of the operation of the ΔP compensator to maintain the quantity under the radical $\sqrt{\rho\Delta P}$ or $$\sqrt{\frac{P_1\Delta P}{T}}$$

at a constant value. In a trial run the following values are used in the equation:

$M_1$ = 2 pounds per second
$K_1$ = 0.5
$P_1$ = 400″ of H$_2$O
$T$ = 400° R
$\Delta P$ = 4″ of H$_2$O
$A$ = 2 in 2 or needle position value $x$.

Substituting these values in the above equation $$M = 2 = M_1$$

Now if the inlet temperature and pressure are changed to 600° R and 800″ of H$_2$O the new required ΔP to maintain the quantity under the radical constant is $$\Delta P = 3'' \text{ of H}_2\text{O}$$

The ΔP compensator (Figure 1) moves the setting contact 118 to the required ΔP setting (3″ H$_2$O) along coil 124 and valve 128 operates to restrict the discharge of fluid from the orifice thereby building up the pressure on the downstream side, a sufficient amount to reduce the ΔP from 4″ to 3″ of H$_2$O.

The method of operation of the flowmeter of this invention is apparent from the description of the drawings given above. The fundamental operation of the device is as follows: A calibration curve is run holding the $\rho \Delta P$ at a constant value (chosen to minimize viscosity effects). The rate of flow is then given by the indicator attached to the positioning screw on the needle valve (the positioning screw is set to the chosen constant $\Delta P$ setting for the various rates of flow). The indicator reading against flow is then the calibration of the unit. For fluids of different densities $\Delta P$ needs only to be varied to maintain the $\sqrt{\rho \Delta P}$ constant and the same calibration will hold.

The flowmeter of this invention lends itself to direct control applications. A typical application is shown in Figure 1 of the drawings wherein the $\Delta P$ across the orifice is used to operate the control action itself. The operation resolves itself into setting the needle valve to the desired rate of flow and the unit then delivers the prescribed mass flow.

The invention is therefore seen to reside in a flowmeter the component parts of which are specially designed and bear a definite structural and functional relationship to each other and in the application of this flowmeter to various control functions. Obviously slight changes in design can be made by those skilled in the art without vitiation of the functional relationship. Such changes are intended to be included within the scope of the invention to the extent as defined by the herewith appended claims.

The invention described herein may be manufactured and used by or for the Government of the United States of America for governmental purposes without the payment of any royalties thereon or therefor.

What is claimed is:

1. A flowmeter for controlling the rate of mass flow of fluids subject to pressure and temperature changes passing therethrough, comprising a body provided with a chamber, inlet and outlet fluid conduits communicating with said chamber, a plate provided with an orifice positioned in said chamber across said outlet conduit, first means including a valve in said outlet conduit for maintaining a constant pressure differential between the inlet and outlet sides of said orifice during constant temperature and pressure conditions in the inlet side of said chamber, and second means for modifying said first means to compensate for variation of said inlet temperature and pressure, the connection between said first and second means including null point connectable elements insuring positive action on said valve whenever said elements are out of alignment.

2. A flowmeter for controlling the rate of mass flow of fluids subject to pressure and temperature changes passing therethrough, comprising a body provided with a chamber, inlet and outlet fluid conduits communicating with said chamber, a plate provided with an orifice positioned in said chamber across said outlet conduit, a valve in said outlet conduit, and means subject to temperature and pressure changes in said chamber on the inlet side thereof and pressure differential changes in said chamber through said orifice for actuating said valve for maintaining said chamber pressure differential approximately constant.

3. A flowmeter for controlling the rate of mass flow of fluids subject to pressure and temperature changes passing therethrough, comprising a body provided with a chamber, inlet and outlet fluid conduits communicating with said chamber, a plate provided with an orifice positioned in said chamber across said outlet conduit, first means for maintaining a constant pressure differential between the inlet and outlet sides of said chamber orifice during flow of constant density fluids, and second means for adjusting said first means on change in density of fluid passing through said flowmeter to compensate for said density change, whereby the pressure differential through said chamber orifice is maintained constant.

4. A variable orifice flowmeter for controlling the rate of mass flow of fluids subject to density changes and passing therethrough, comprising a body provided with a chamber, inlet and outlet fluid conduits communicating with said chamber, a plate provided with an orifice positioned in said chamber across said outlet conduit, a main valve for varying the effective area of said orifice and thereby the mass of fluid flow, first means including a control valve in said outlet conduit for maintaining constant pressure differential between the inlet and outlet sides of said orifice during flow of constant density fluid through said orifice, and second means for adjusting said first means to compensate for density variation in the fluid flow, said main valve being tapered and movable within said orifice and surface ground to produce a direct variation in fluid mass flow with change of valve position.

5. In a flowmeter for indicating and controlling the flow of fluid through a conduit, a first valve for manual adjustment of the volume of fluid flow, a second valve downstream from said first valve, and means for holding said second valve at an opening such as to maintain a constant pressure differential through said first valve, said means including a reversible motor connected to said second valve for movement thereof to opened and closed positions, two ducts one connected to the conduit upstream and the other downstream of said first valve, a pressure responsive element connected in series with said ducts, a first power translating device connected to said pressure element, a third duct connected to the conduit upstream of said first valve, pressure and temperature responsive elements connected to said third duct, a second power translating device connected to said pressure and temperature responsive elements, power summing apparatus connected to said first and second power translating devices, and connections between said motor and said power summing apparatus whereby the algebraic sum of said power translating devices is transmitted to said motor to cause automatic positioning of said second valve for a constant pressure differential through said first valve.

References Cited in the file of this patent
UNITED STATES PATENTS

| Number | Name | Date |
|---|---|---|
| 1,487,402 | Roncka | Mar. 18, 1924 |
| 2,173,979 | Picut | Sept. 26, 1939 |
| 2,295,728 | Gess | Sept. 15, 1942 |
| 2,402,332 | Lee | June 18, 1946 |
| 2,470,452 | Ackley | May 17, 1949 |
| 2,487,774 | Schipper | Nov. 8, 1949 |